United States Patent

Dinger et al.

(10) Patent No.: US 7,523,093 B2
(45) Date of Patent: Apr. 21, 2009

(54) SYSTEM AND METHOD FOR PROVIDING TRICKLE RESOURCE DISCOVERY

(75) Inventors: John E. Dinger, Cary, NC (US); James C. Fletcher, Apex, NC (US); John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 11/325,139

(22) Filed: Jan. 3, 2006

(65) Prior Publication Data

US 2007/0168554 A1 Jul. 19, 2007

(51) Int. Cl.
*G06F 7/00* (2006.01)
*G06F 17/30* (2006.01)
(52) U.S. Cl. .......................................... 707/2; 707/101
(58) Field of Classification Search ........................ None
See application file for complete search history.

(56) References Cited

U.S. PATENT DOCUMENTS

| | | | | |
|---|---|---|---|---|
| 5,978,594 | A * | 11/1999 | Bonnell et al. ................. | 710/17 |
| 6,529,950 | B1 | 3/2003 | Lumelsky et al. | |
| 6,549,932 | B1 | 4/2003 | McNally et al. | |
| 6,859,926 | B1 | 2/2005 | Brenner et al. | |
| 7,047,322 | B1 * | 5/2006 | Bauman et al. ................. | 710/6 |
| 2003/0145210 | A1 * | 7/2003 | Taylor ......................... | 713/182 |

FOREIGN PATENT DOCUMENTS

JP 2000047979 2/2000

OTHER PUBLICATIONS

Menasce et al., Probabilistic Scalable P2P Resource Location Services, pp. 48-58.
Mummert et al., Exploiting Weak Connectivity for Mobile File Access, SIGOPS, Dec. 1995, pp. 143-155.
Nacinovich, M., Web-Based HR Software Trickles Down, Accounting Technology, Aug. 1998, vol. 14, No. 7, pp. 45-46.
Satyanarayanan, M., The Evolution of Coda, ACM Transactions on Computer Systems, May 2002, vol. 20, No. 2, pp. 85-124.

* cited by examiner

*Primary Examiner*—John E Breene
*Assistant Examiner*—Aleksandr Kerzhner
(74) *Attorney, Agent, or Firm*—Dillon & Yudell LLP

(57) ABSTRACT

A method, apparatus, and computer-usable medium for retrieving a first entry from a collection of trickle confirmation entries (associated with a first collection of resources that require configuration confirmation) from a trickle confirmation queue. A first resource among the first collection of resources associated with the first entry from the collection of trickle confirmation entries is queried for a potential change in configuration of the first resource. If a potential change in configuration is detected, the first entry from the collection of trickle confirmation entries is inserted on a trickle update queue. A first entry from a collection of trickle update entries (associated with a second collection of resources that require configuration update) is retrieved from the trickle update queue. Configuration information regarding a first resource associated with the first entry from the collection of trickle update entries is updated.

14 Claims, 14 Drawing Sheets

| RESOURCE 352 | LAST CONFIRMATION 354 | LAST UPDATE 356 | POTENTIAL CHANGE 358 |
|---|---|---|---|
|  |  |  |  | ns
SYSTEM AND METHOD FOR PROVIDING TRICKLE RESOURCE DISCOVERY

BACKGROUND OF THE INVENTION

The present invention relates in general to the field of computers and similar technologies, and in particular to software utilized in this field. Still more particularly, the present invention relates to resource discovery.

Early computers were stand-alone units, which accessed and processed only local databases using local computer programs. Today, however, modem computers are often networked, thus providing client computers on a network access to a variety of resources, including data, computer programs, hardware devices (including storage drives and printers), etc. This resource availability is especially prevalent with the advent of the Internet, World Wide Web, private intranets and extranets, etc., which provide access to web pages, databases, programs, and similar resources. Development of software for modem computers, once a task performed by a single programmer or a small group of programmers, is now performed by teams of developers and associated technical writers that document the software.

"Resource discovery" is a process where data regarding information technology (IT) assets are gathered from a particular computing environment, usually for the purpose of managing that computing environment and the associated resources. Examples of resources include, but are not limited to, servers, storage arrays, networks, networking hardware, servers, and applications. The data regarding resources within a computing environment are typically gathered into a "configuration management database" for reporting, auditing, and normalizing IT resource configurations. A "discovery database" is a storage depot for information about discovered resources in the computing environment.

Those with skill in the art will appreciate that the process of populating the discovery database (e.g., discovery) is performed in bulk, usually with some amount of performance throttling to prevent depleting resource (e.g., CPU, network bandwidth, etc) on the network. The system performing the bulk discovery is provided with a set of target resources, either explicitly or by a network address range, to explore for additional information.

Information discovered via bulk discovery can quickly become outdated, so discovery must be performed on an ongoing basis. It is desirable for the data concerning the resources to be as updated as possible to present an accurate picture of the current system configuration. Therefore, there is a need for a system and method of resource discovery that provides updated resource data through efficient utilization of system resources.

SUMMARY OF THE INVENTION

The present invention includes, but is not limited to, a method, apparatus, and computer-usable medium for retrieving a first entry from a collection of trickle confirmation entries (associated with a first collection of resources that require configuration confirmation) from a trickle confirmation queue. A first resource among the first collection of resources associated with the first entry from the collection of trickle confirmation entries is queried for a potential change in configuration of the first resource. If a potential change in configuration is detected, the first entry from the collection of trickle confirmation entries is inserted on a trickle update queue. A first entry from a collection of trickle update entries (associated with a second collection of resources that require configuration update) is retrieved from the trickle update queue. Configuration information regarding a first resource associated with the first entry from the collection of trickle update entries is updated.

The above, as well as additional purposes, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
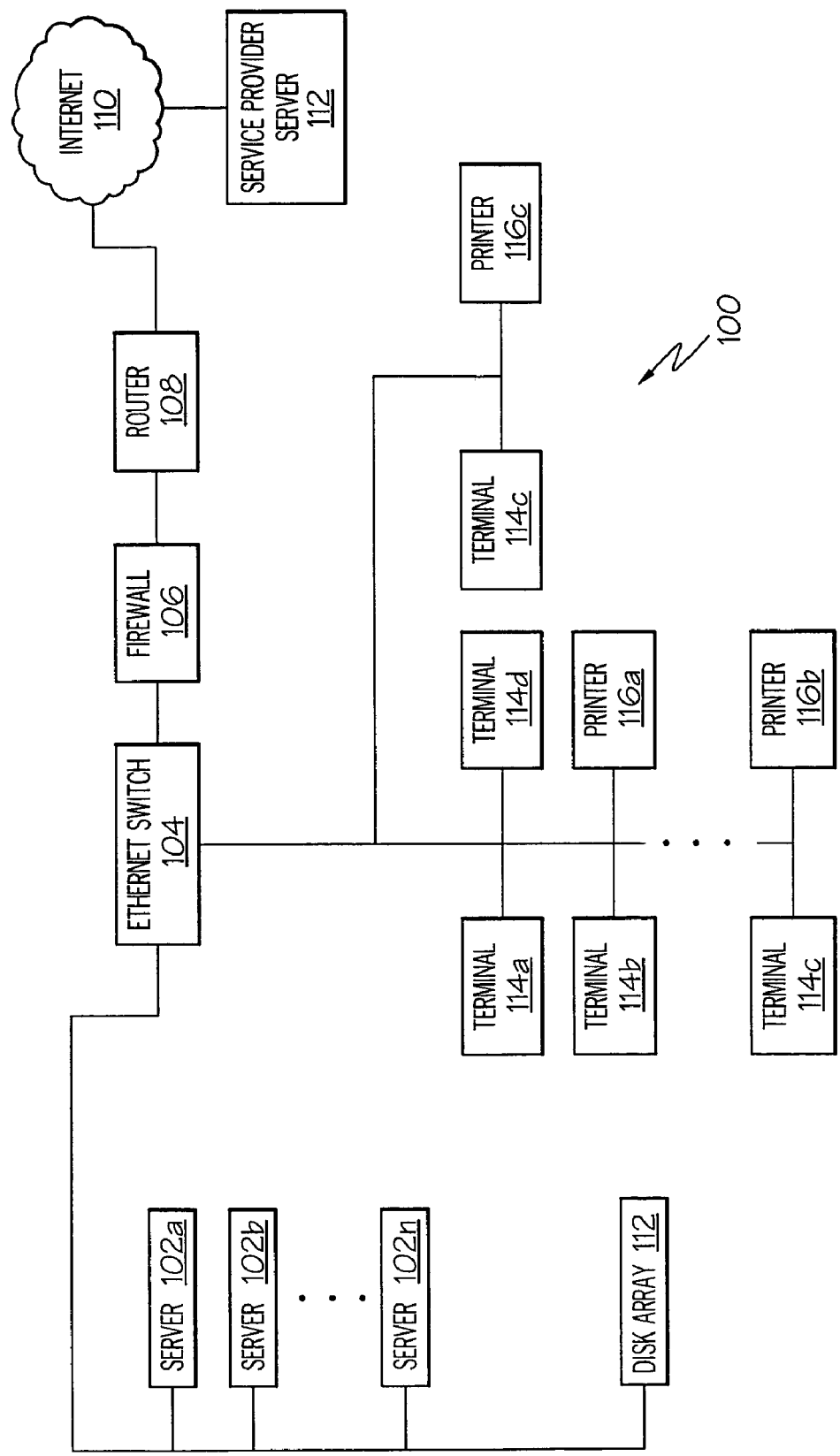
FIG. 1 is a block diagram of an exemplary network in which a preferred embodiment of the present invention may be implemented.

With reference to the figures, and in particular, referring to FIG. 1, there is illustrated a block diagram of an exemplary network in which a preferred embodiment of the present invention may be implemented. As illustrated, network 100 includes a collection of servers 102a-n, Ethernet switch 104, firewall 106, router 108, disk array 112, terminals 114a-e, and printers 116a-c. While network 100 is depicted as a local area network (LAN), those with skill in the art will appreciate that the present invention may be implemented in any network configuration such as a linear, circle, or star topologies and include wide area networks (WAN).

Servers 102a-n may be implemented as any type of server including, but not limited to, file servers, mail servers, and database management system servers (e.g., SQL servers) utilized to respond to queries from client computers. As depicted, servers 102a-n is coupled to disk array 112, which is utilized for mass storage of data, instructions, applications, etc.

Coupling servers 102a-n to a collection of terminals 114a-e and printers 116a-c is Ethernet switch 104. Terminals 114a-e enable clients within network 100 to access the service provided by servers 102a-n. Printers 116a-c are shared printers that may be utilized by any computer system on network 100.

Router 108 couples servers 102a-n to Internet 110. Also, router 108 acts as the first line of defense for network 100 from malicious messages sent via Internet 110. Firewall 106 examines the messages that pass through router 108 and compares the properties of the messages to a set of predetermined firewall rules. If the examined message meets all the criteria of the firewall rules, firewall 106 allows the message to be forwarded to the requesting computer, such as server 102a-n or terminals 114a-e. Service provider server 112, discussed herein in more detail in conjunction with FIGS. 5-8, is utilized to provide process software of the method described herein, and in particular as shown and described in FIGS. 4A-B to servers 102a-n.

Those skilled in the art will appreciate that network 100 can include many additional components not specifically illustrated in FIG. 1. Because such additional components are not necessary for an understanding of the present invention, they are not illustrated in FIG. 1 or discussed further herein.

Figure 2:
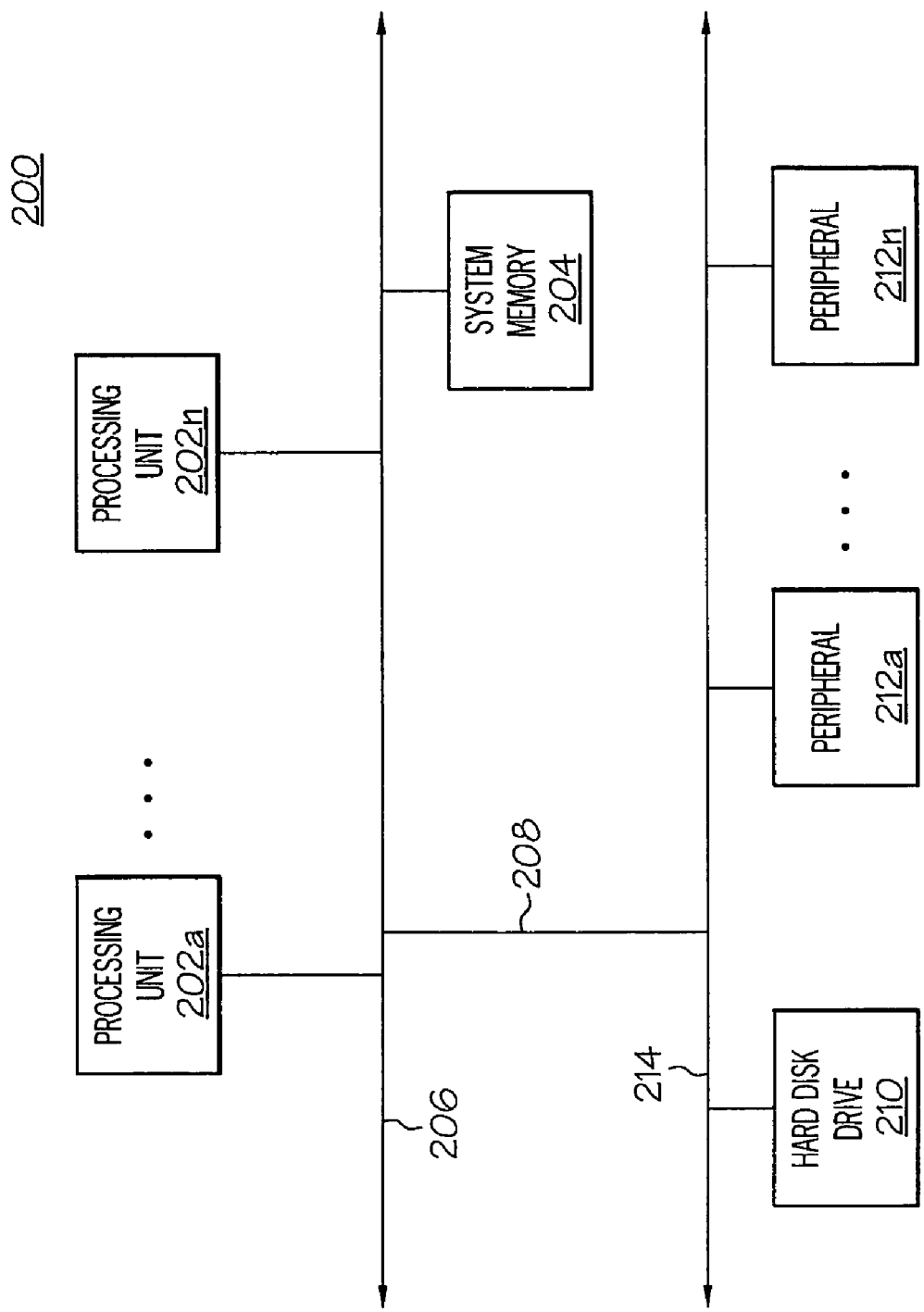
FIG. 2 is a block diagram of an exemplary data processing system in which a preferred embodiment of the present invention may be implemented.

Referring to FIG. 2, there is depicted a block diagram of an exemplary data processing system in which a preferred embodiment of the present invention may be implemented. Data processing system 200 may be utilized to implement servers 102a-n and terminals 114a-e. As depicted, exemplary data processing system 200 includes processing unit(s) 202, shown as processing units 202a and 202n in FIG. 2, which are coupled to system memory 204 via system bus 206. Preferably, system memory 204 may be implemented as a collection of dynamic random access memory (DRAM) modules. Typically, system memory 204 includes data and instructions for running a collection of applications. Mezzanine bus 208 acts as an intermediary between system bus 206 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 is a collection of peripherals 212a-n.

Those skilled in the art will appreciate that data processing system 200 can include many additional components not specifically illustrated in FIG. 2. Because such additional components are not necessary for an understanding of the present invention, they are not illustrated in FIG. 2 or discussed further herein. It should also be understood, however, that the enhancements to data processing system 200 to improve handling of shared resources provided by the present invention are applicable to data processing systems of any system architecture and are in no way limited to the generalized multi-processor architecture or symmetric multi-processing (SMP) architecture illustrated in FIG. 2.

Figures 3A, 3B:
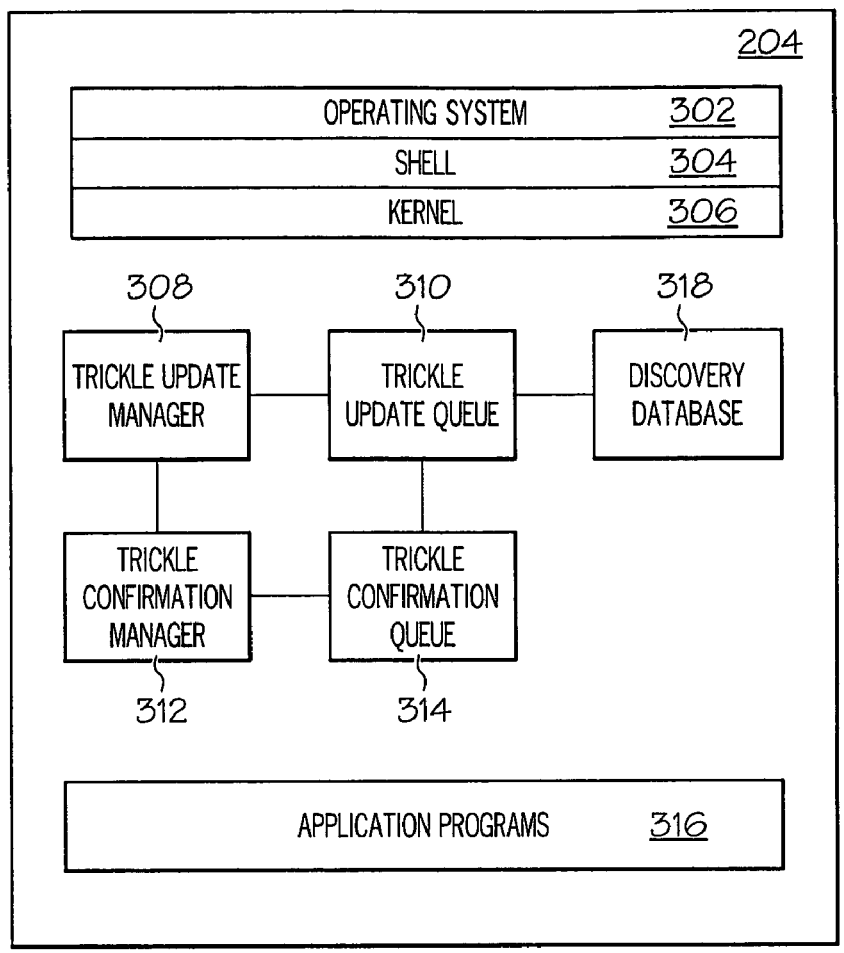
FIG. 3A is a block diagram of exemplary contents of a system memory illustrated in FIG. 2 according to a preferred embodiment of the present invention.
FIG. 3B is a block diagram of an exemplary queue entry according to a preferred embodiment of the present invention.

FIG. 3A is a block diagram illustrating exemplary contents of system memory 204 depicted in FIG. 2 according to a preferred embodiment of the present invention. As illustrated, system memory 204 includes operating system 302, which further includes shell 304 for providing transparent user access to resources such as application programs 316. Generally, shell 304 is a program that provides an interpreter and an interface between the user and the operating system. More specifically, shell 304 executes commands that are entered into a command line user interface or a file. Thus, shell 304 (as it is called in UNIX®), also called a command processor in Windows®, is generally the highest level of the operating system software hierarchy and servers as a command interpreter. The shell provides a system prompt, interprets commands entered by keyboard, mouse, or other user input media, and sends the interpreted command(s) to the appropriate lower levels of the operating system (e.g., kernel 306) for processing. Note that while shell 304 is a text-based, line-oriented user interface, the present invention will support other user interface modes, such as graphical, voice, gestural, etc. equally well.

As illustrated, operating system 302 also includes kernel 306, which includes lower levels of functionality for operating system 302, including providing essential services required by other parts of operating system 302 and application programs 316, including memory management, process and task management, disk management, and mouse and keyboard management. Application programs 316 can include a browser, utilized for access to Internet 110, word processors, spreadsheets, and other application programs.

Still referring to FIG. 3A, system memory 204 includes trickle update manager 308, trickle update queue 310, trickle confirmation manager 312, trickle confirmation queue 314, and discovery database 318. Trickle confirmation queue 314 stores queue entries associated to resources on network 100. Trickle confirmation manager 312 retrieves queue entries (e.g., queue entry 350) from trickle confirmation queue 314 and determines if a potential change as occurred in a resource corresponding to the first entry. As discussed herein in more detail in conjunction with FIG. 4A, potential changes in the associated resource can be detected by examining metadata in a configuration file associated with the resource or computing a checksum over the configuration file.

Trickle update queue 310 stores queue entries associated to resources on network 100 which have been determined by trickle confirmation manager 312 to have undergone a potential change (e.g., change in a configuration of the resource), as previously discussed. Trickle update manager 308 retries queue entries (e.g., queue entry 350) from trickle update queue 310, retrieved any updated information from the resource associated with the queue entries, and sends any updated information to discovery database 218. Discovery database 218 is utilized to store configuration information regarding resources on network 100.

FIG. 3B is a block diagram illustrating an exemplary queue entry 350 according to a preferred embodiment of the present invention. As depicted, queue entry 350 includes resource field 352, last confirmation time field 354, last update time field 356, and potential change field 358. Resource field 352 indicates the resource associated with queue entry 350. As previously discussed, resources on network 100 may be shared printers, network interfaces, application software, etc.

Last confirmation time field 354 stores the last time the resource associated with queue entry 350 was confirmed for potential changes by trickle confirmation manager 312. Last update time field 356 indicates the last time the information stored in discovery database 318 associated with the resource has been updated by trickle update manager 308. Potential change field 358 indicates whether or not trickle confirmation manager 312 has detected a potential change in the configuration of the resource associated with queue entry 350.

As previously discussed, networks, such as network 100, require that resources (e.g., shared printers, network interfaces, application software, etc.) utilized on the network are properly configured. Generally, an exemplary method of trickle discovery provided by a preferred embodiment of the present invention is preferably bifurcated into two processes: trickle confirmation and trickle update. During trickle confirmation, the resources are briefly checked to determine if a potential change has been made to the drivers, configuration files, etc. associated with the resource. Then, during trickle update, all resources with a detected potential change are queried for updated information. The updated information is written to discovery database 318.

Figure 4A:
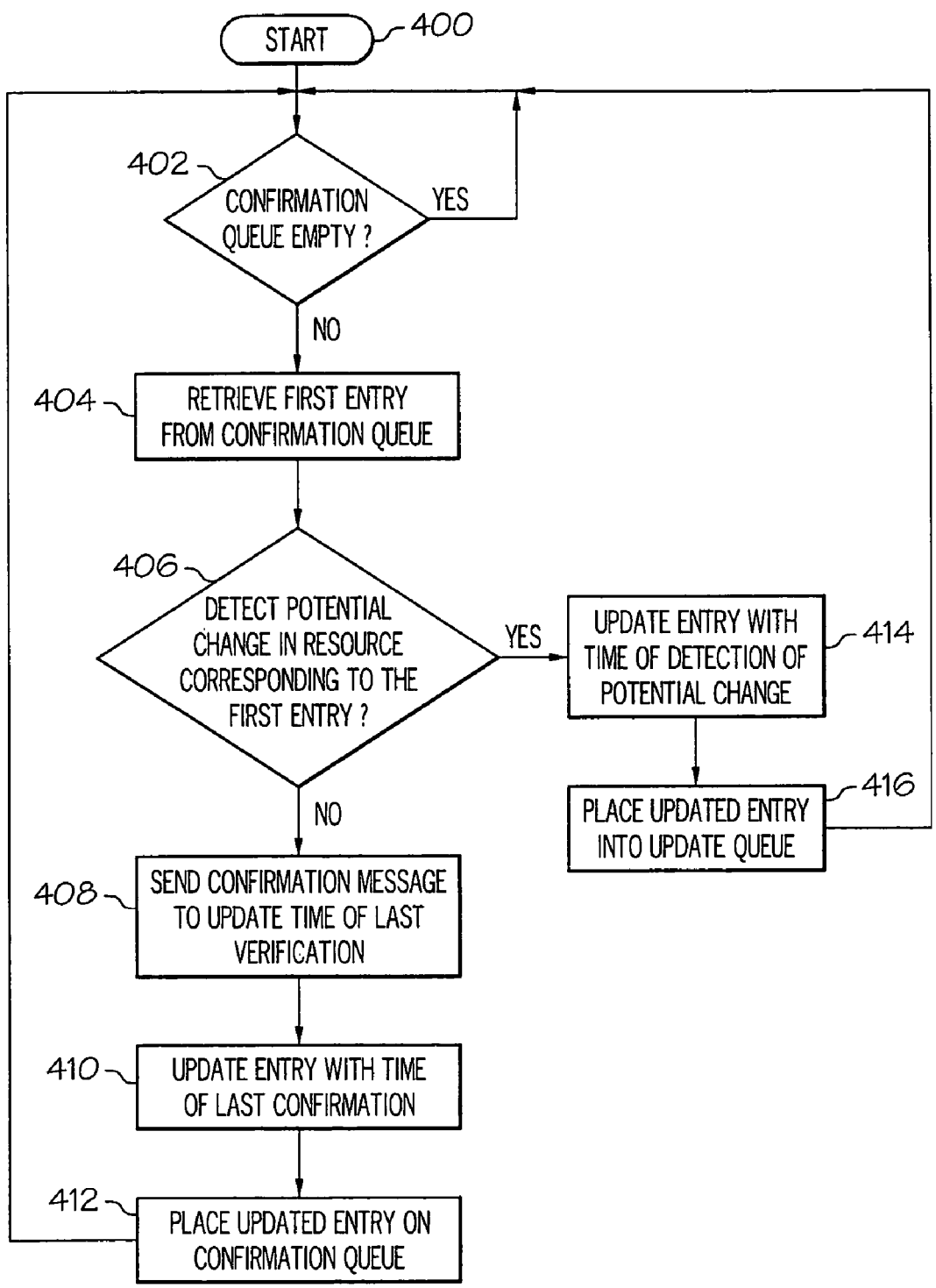
FIG. 4A is a high-level logical flowchart illustrating an exemplary method of trickle confirmation according to a preferred embodiment of the present invention.

FIG. 4A is a high-level logical flowchart illustrating an exemplary trickle confirmation according to a preferred embodiment of the present invention. The process begins at step 400 and proceeds to step 402, which depicts trickle confirmation manager 312 determining if trickle confirmation queue 314 is empty (e.g., does not include any entries). If trickle confirmation queue 314 is empty, the process iterates at step 402.

If trickle confirmation manager 312 determines that trickle confirmation queue 402 is not empty, the process continues to step 404, which illustrates trickle confirmation manager 312 retrieving a first entry from trickle confirmation queue 314 and determining if a potential change has occurred in a resource corresponding to the first entry (step 406). In a preferred embodiment of the present invention, trickle confirmation manager 312 determines if a potential change has occurred in a resource by examining metadata in an associated configuration file or computing a checksum over the configuration file.

If trickle confirmation manager 312 does not detect a potential change, the process continues to step 408, which illustrates trickle confirmation manager 312 sending a confirmation message to update last confirmation time field 354 of the first entry with the time of last confirmation (step 410). After last confirmation time field 354 has been updated, trickle confirmation manager 312 places the updated entry on trickle confirmation queue 310 (step 412). The process returns to step 402 and proceeds in an iterative fashion.

Returning to step 406, if trickle confirmation manager 312 detects a potential change in the resource corresponding to the retrieved entry, the process continues to step 414, which illustrates trickle confirmation manager 312 updating potential change field 358 with the time that the last potential change was detected. The retrieved entry is placed on trickle update queue 310 for processing, as depicted in step 416. The process returns to step 402 and continues in an iterative fashion.

Figure 4B:
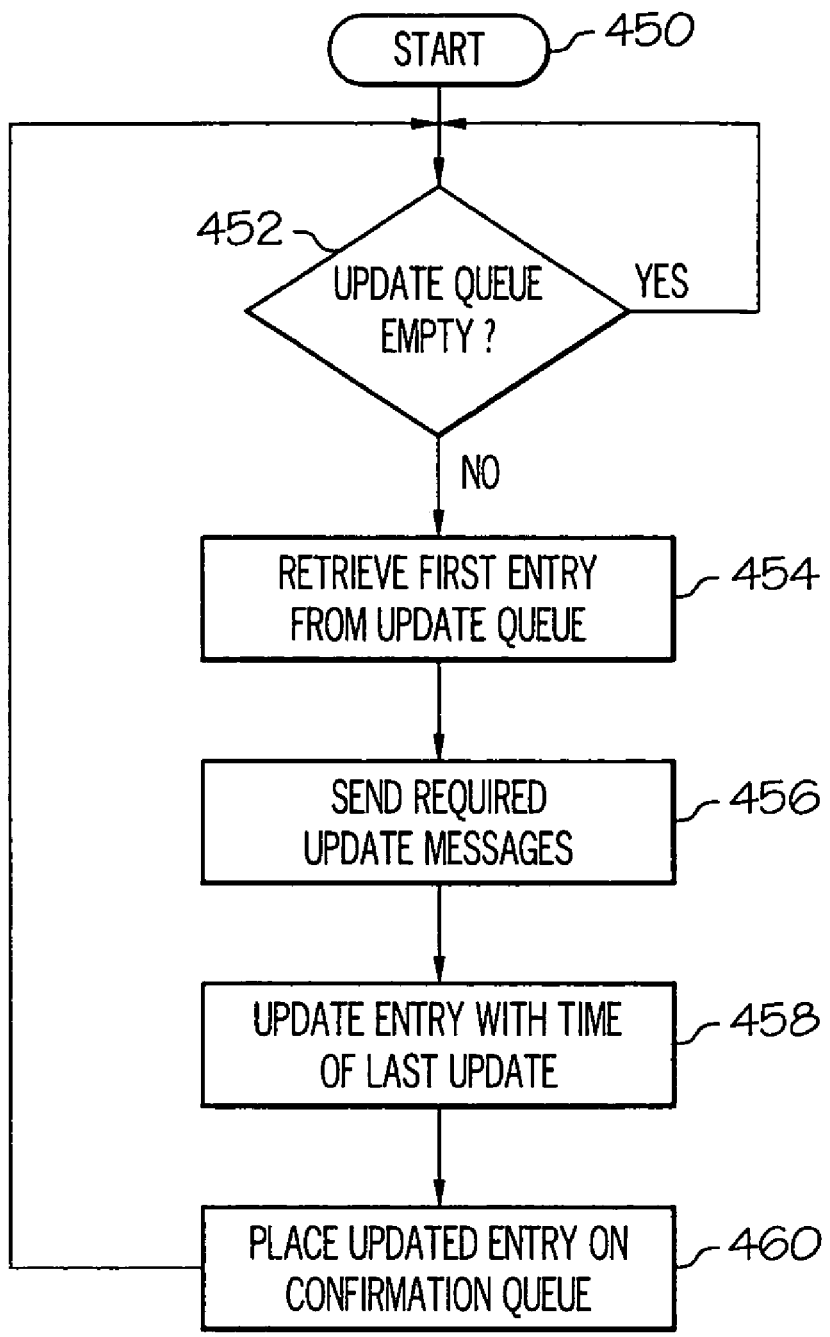
FIG. 4B is a high-level logical flowchart depicting an exemplary method of trickle update according to a preferred embodiment of the present invention.

FIG. 4B is a high-level logical flowchart illustrating an exemplary method of implementing a trickle update according to a preferred embodiment of the present invention. The process begins at step 450 and proceeds to step 452, which illustrates trickle update manager 308 determining if trickle update queue 310 is empty. If trickle update queue 310 is empty, the process iterates at step 452.

If trickle update queue 310 is not empty, trickle update manager 308 retrieves an entry from trickle update queue 310 (step 454) and sends required update messages (step 456). In a preferred embodiment of the present invention, trickle update manager 308 retrieves any updated information from the resource and updates discovery database 218 with the newly updated information.

Trickle update manager 308 updates last update time field 356 in the entry associated with the updated resource (step 458) and places the updated entry on trickle confirmation queue 314 (step 460). The process returns to step 452 and proceeds in an iterative fashion.

As disclosed, the present invention includes retrieving a first entry from a collection of trickle confirmation entries (associated with a first collection of resources that require configuration confirmation) from a trickle confirmation queue. A first resource among the first collection of resources associated with the first entry from the collection of trickle confirmation entries is queried for a potential change in configuration of the first resource. If a potential change in configuration is detected, the first entry from the collection of trickle confirmation entries is inserted on a trickle update queue. A first entry from a collection of trickle update entries (associated with a second collection of resources that require configuration update) is retrieved from the trickle update queue. Configuration information regarding a first resource associated with the first entry from the collection of trickle update entries is updated.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 4A-B, can be deployed as a process software from a service provider server 112 to servers 102a-n.

Figure 5A:
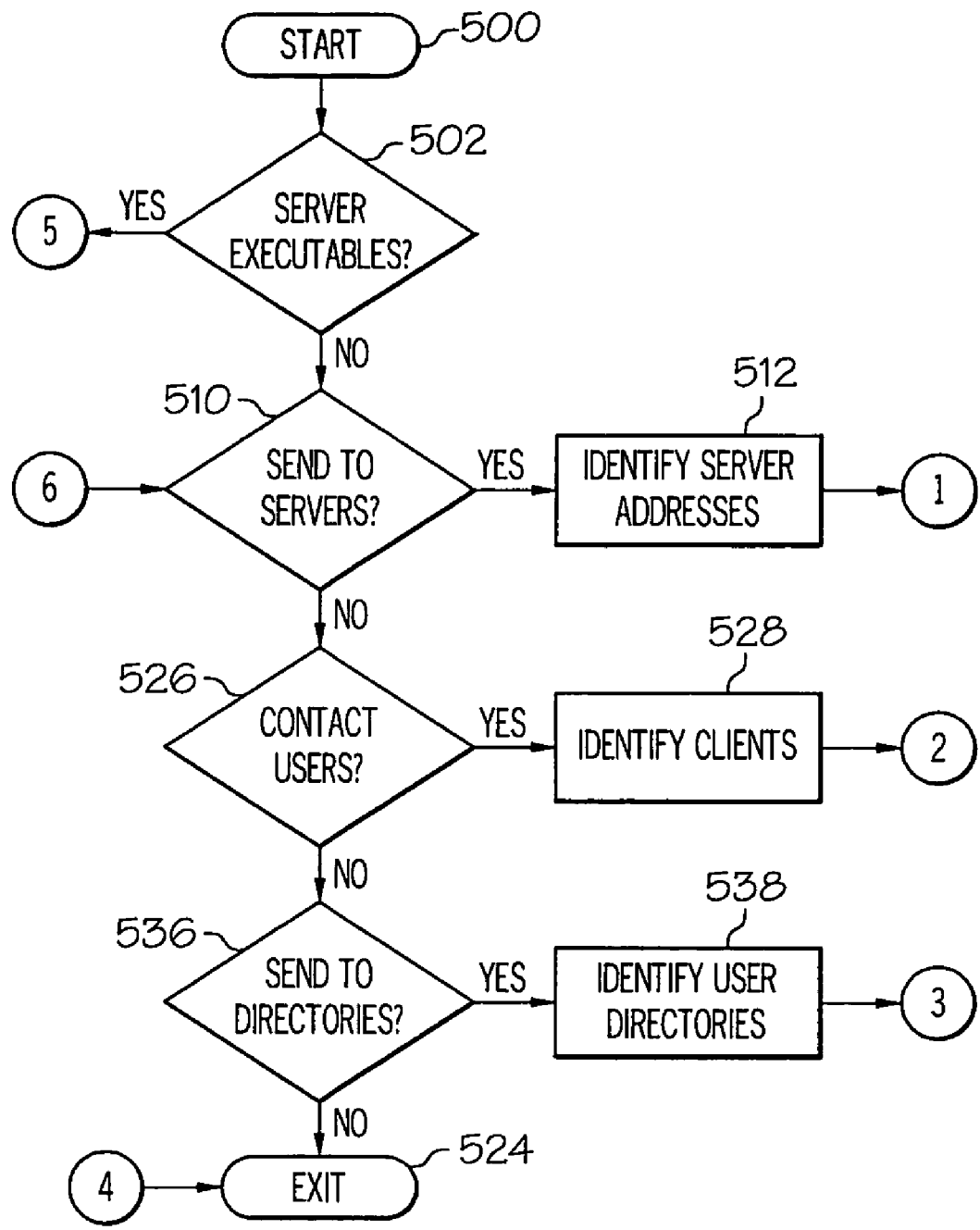
FIGS. 5A-B show a high-level logical flowchart of steps taken to deploy software capable of executing the shown and described in FIGS. 4A-B.
Figure 5B:
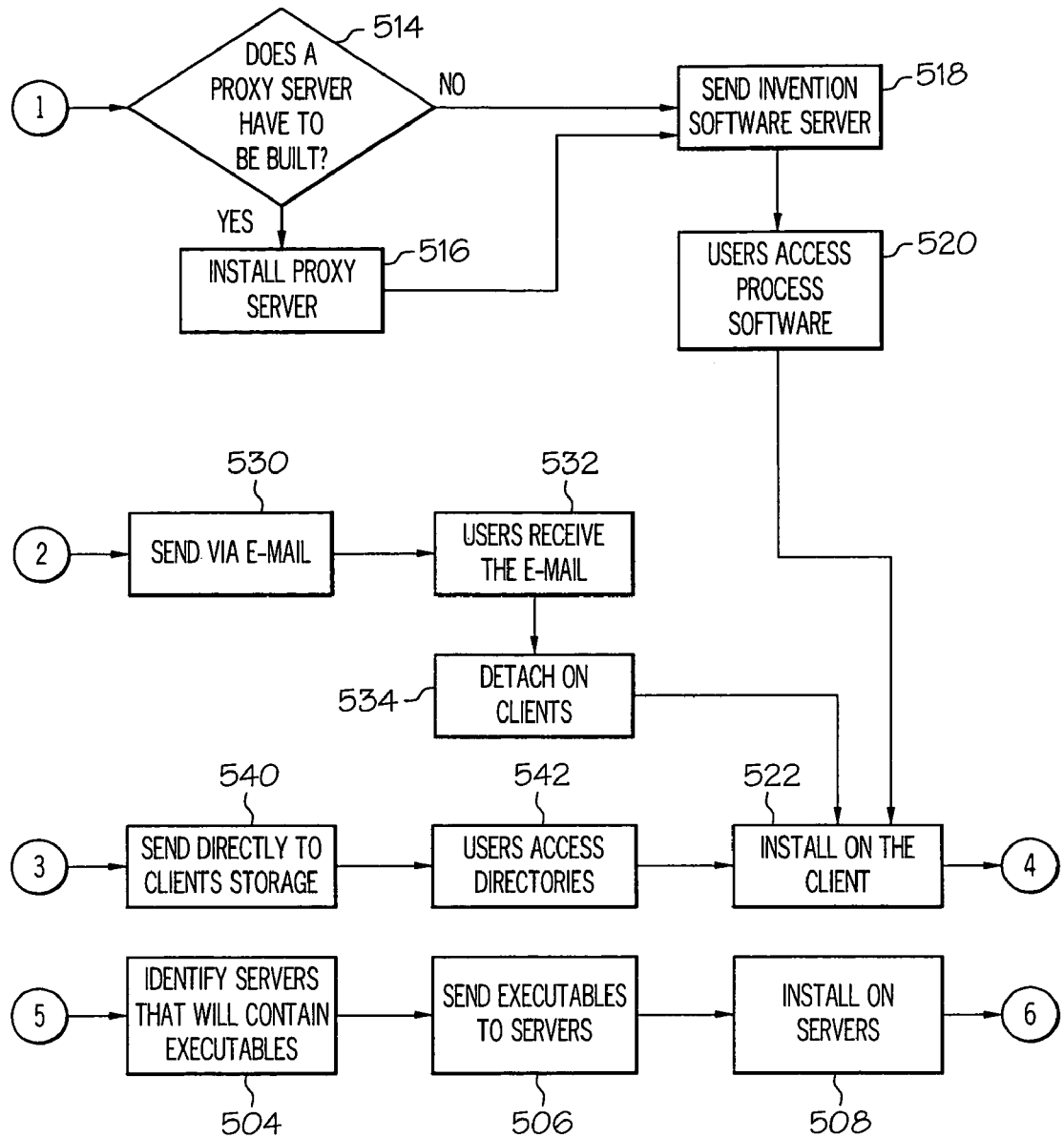

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 6A:
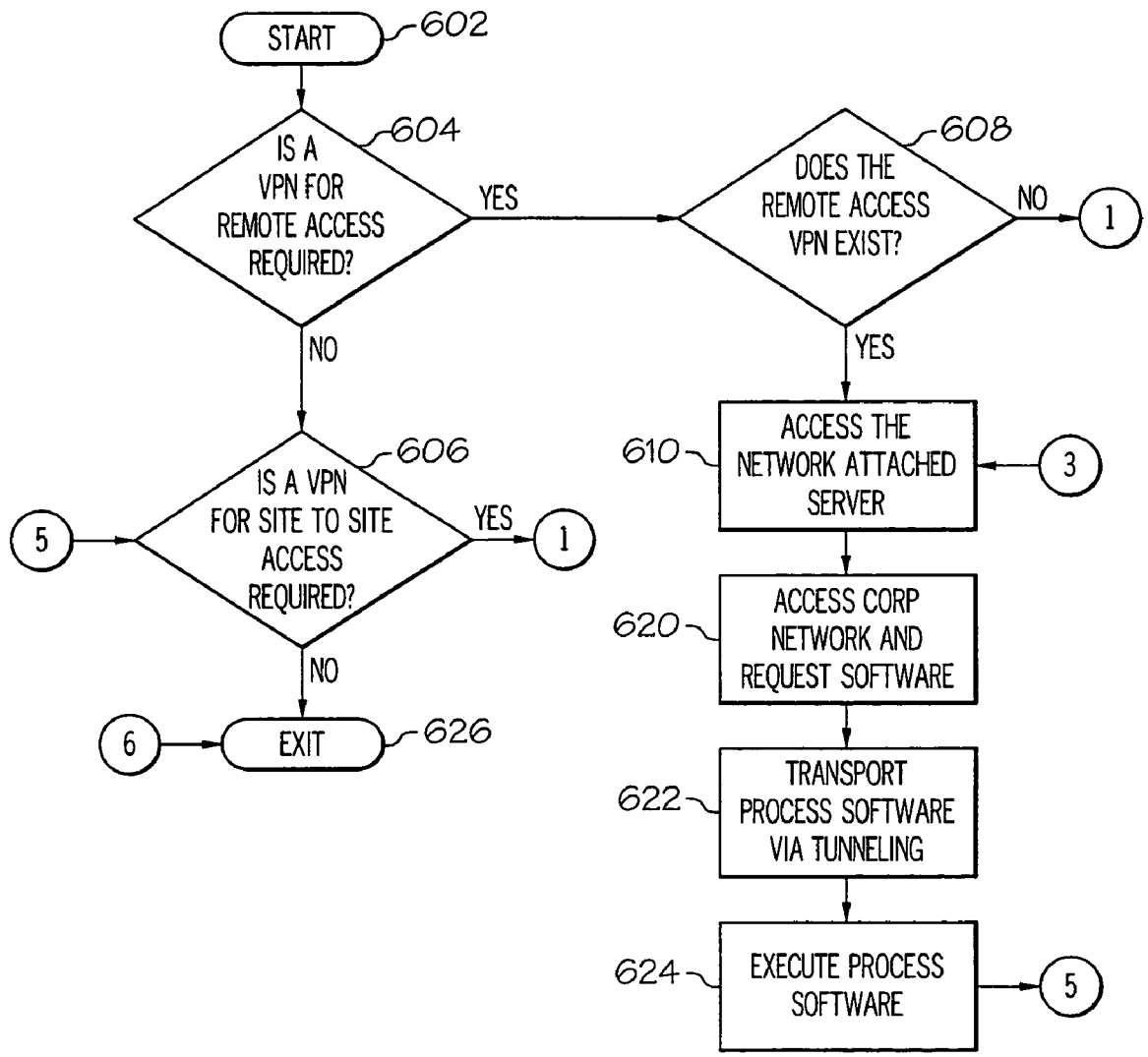
FIGS. 6A-C show a high-level logical flowchart of steps to deploy in a Virtual Private Network (VPN) software that is capable of executing the steps shown and described in FIGS. 4A-B.
Figure 6B:
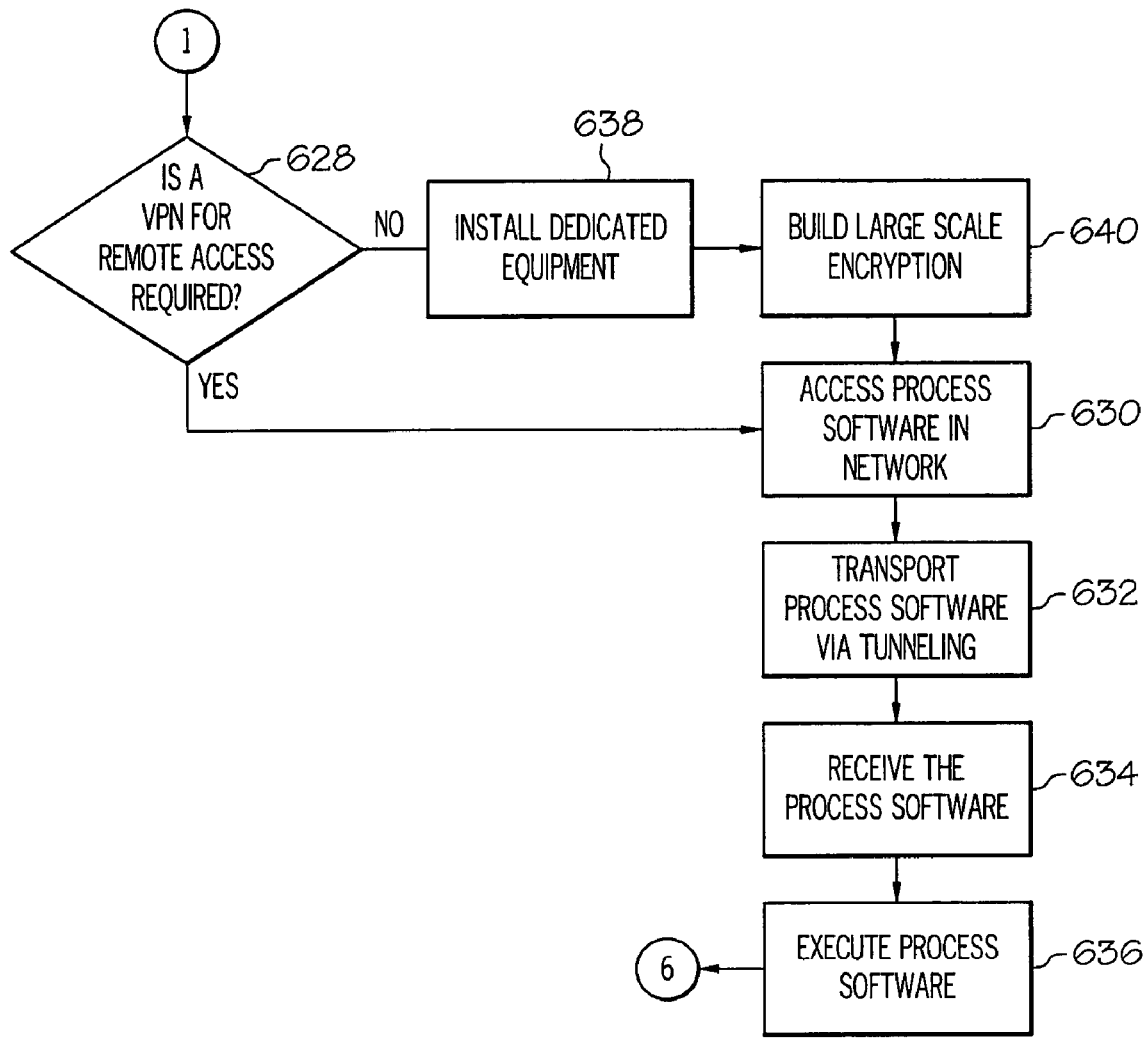
Figure 6C:
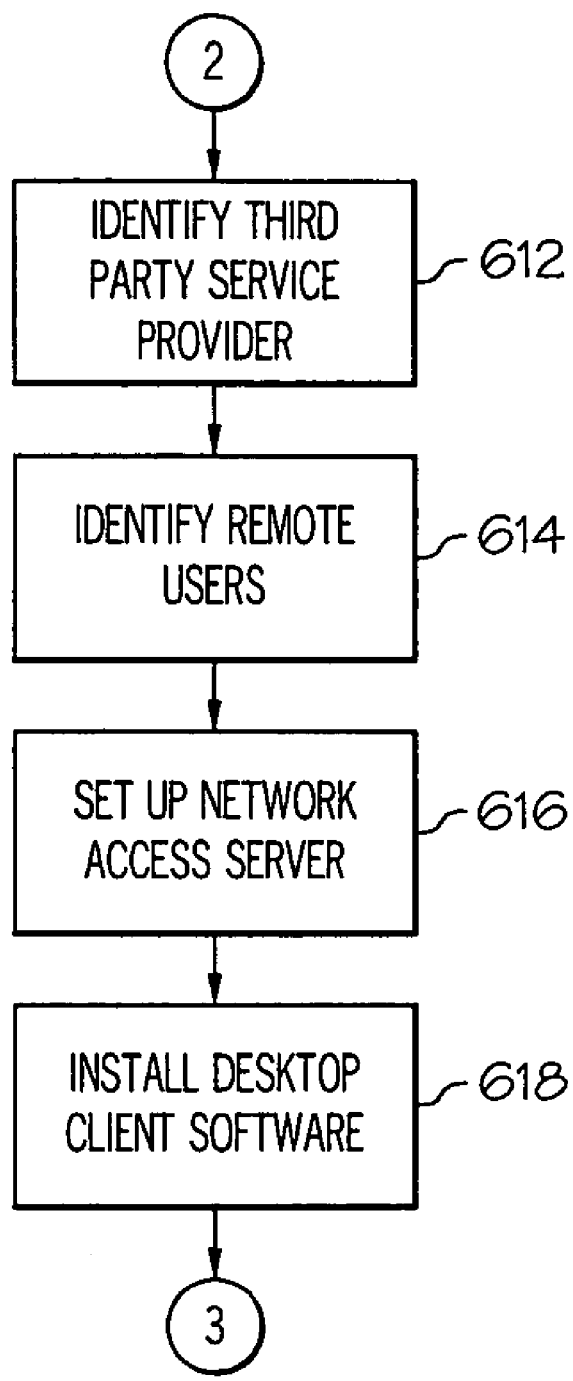

The process for such VPN deployment is described in FIG. 6. Initiator block 602 begins the Virtual Private Network (VPN) process. A determination is made to see if a VPN for remote access is required (query block 604). If it is not required, then proceed to (query block 606). If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process where software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
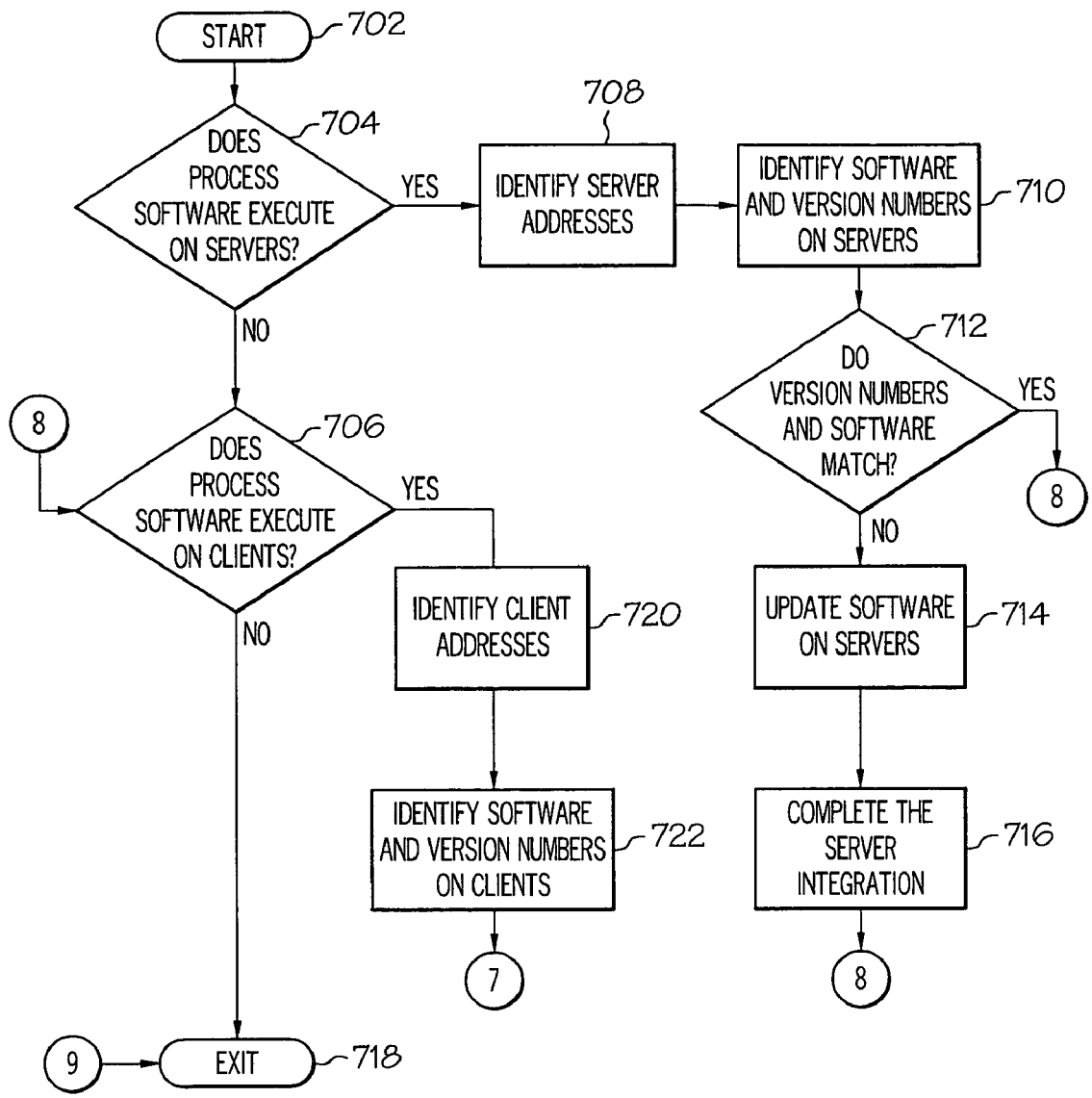
FIGS. 7A-B show a high-level logical flowchart showing steps taken to integrate into a computer system software that is capable of executing the steps shown and described in FIGS. 4A-B.
Figure 7B:
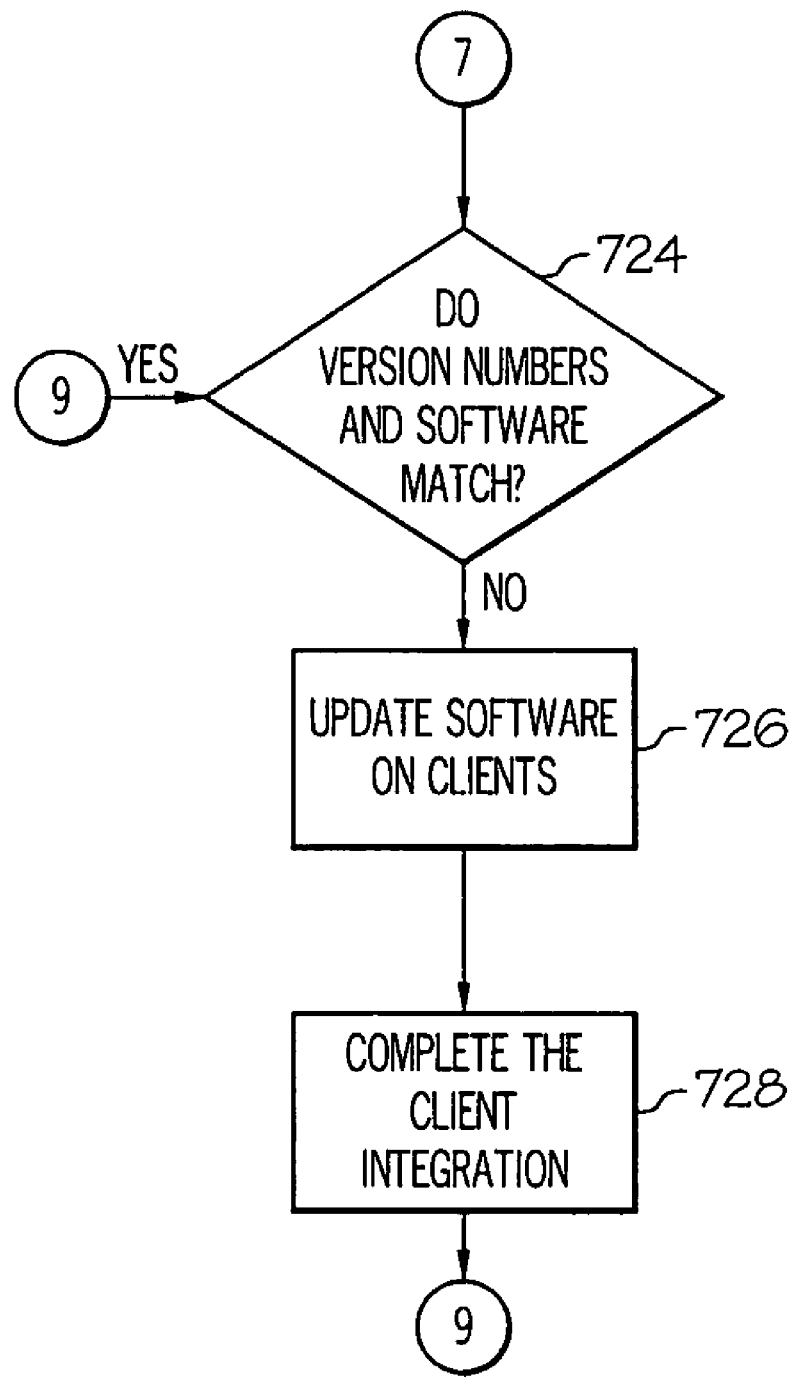

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this is not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is if the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
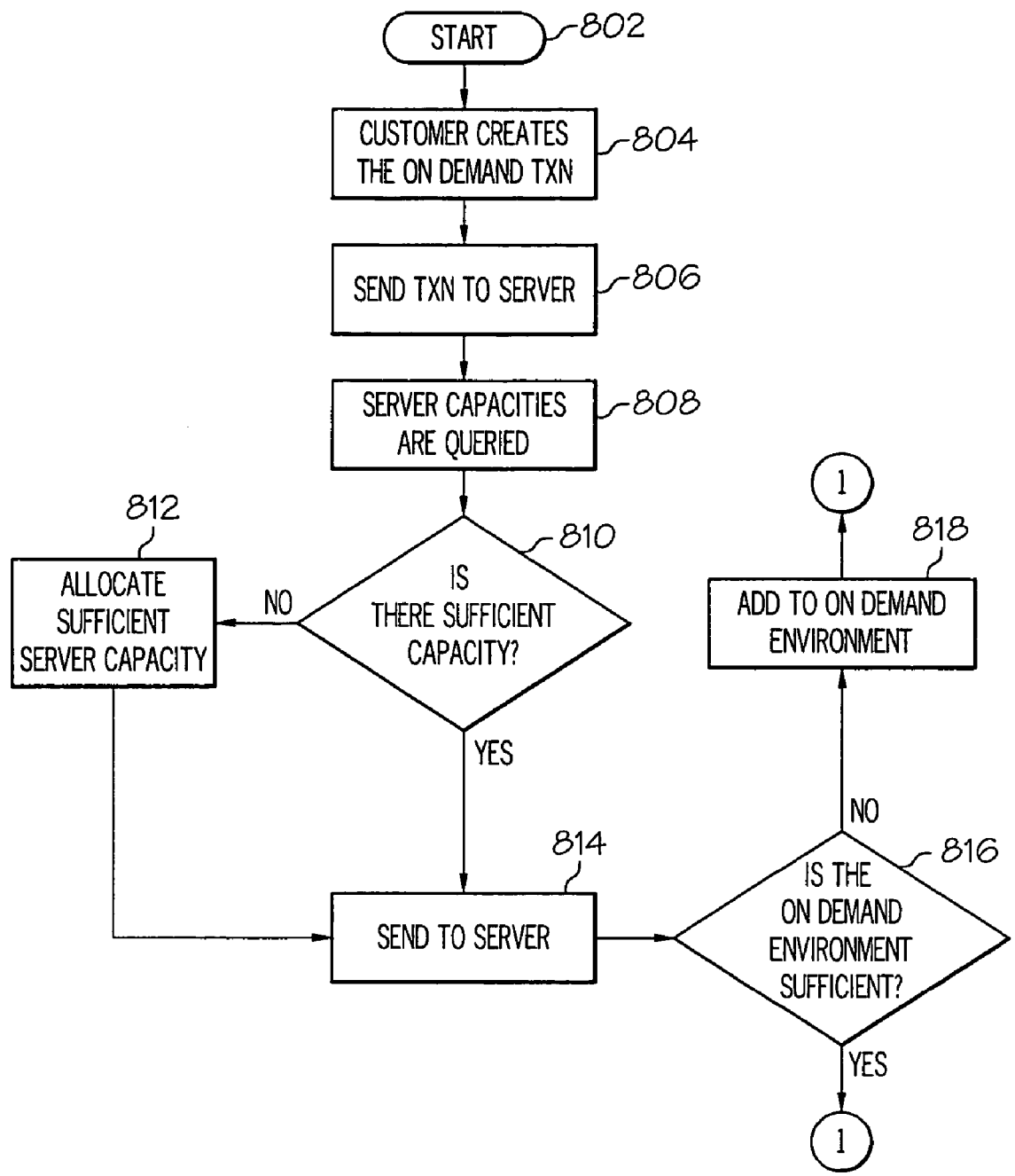
FIGS. 8A-B show a high-level logical flowchart showing steps taken to execute the steps shown and described in FIGS. 4A-B using an on-demand service provider.
Figure 8B:
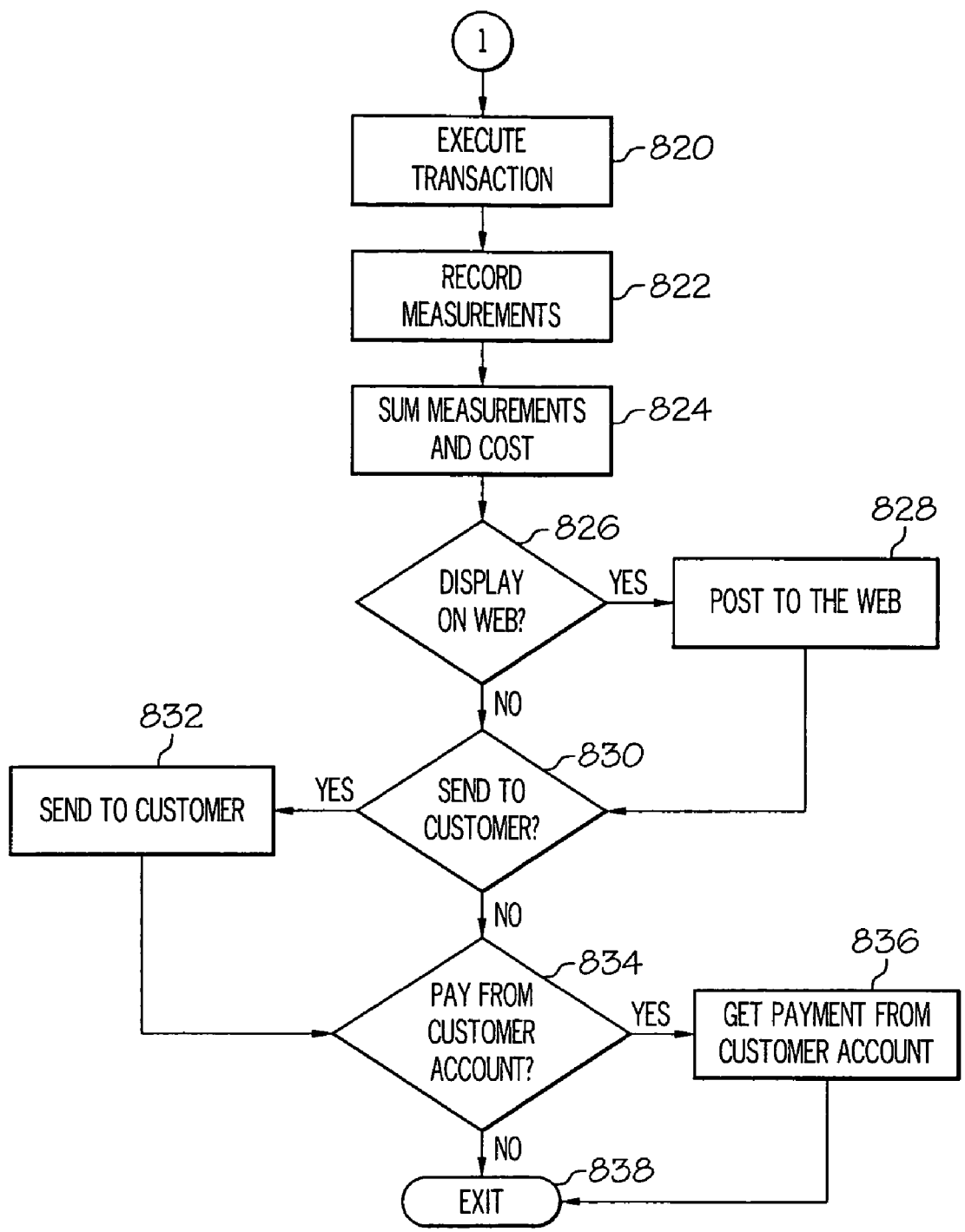

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit-(CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
retrieving a first entry from a plurality of trickle confirmation entries from a trickle confirmation queue stored in the memory of a computer, wherein the plurality of trickle confirmation entries from the trickle confirmation queue is associated with a first plurality of resources on a network, wherein the first plurality of resources require configuration confirmation, and wherein each entry in the trickle confirmation queue comprises:
a resource field that identifies a specific resource from the first plurality of resources,
a last confirmation time field that stores a last time that the specific resource was examined for resource changes, wherein the resource changes comprise changes to a driver for the specific resource,
a last update time field that indicates a last time that information stored in a discovery database was updated by a trickle update manager, wherein the discovery database stores information describing the resource changes, and wherein the trickle update manager monitors the specific resource for the resource changes to the specific resource, and
a potential change field that describes the resource changes for the specific resource;
in response to retrieving the first entry from the plurality of trickle confirmation entries, querying a first resource among the first plurality of resources associated with the first entry from the plurality of trickle confirmation entries for a potential change in configuration to the first resource;
in response to detecting a change to a configuration of the first resource, inserting the first entry from the plurality of trickle confirmation entries on a trickle update queue;
retrieving a first entry from a plurality of trickle update entries from the trickle update queue, wherein the plurality of trickle update entries from the trickle update queue is associated with a second plurality of resources on the network, wherein the first plurality of resources and the second plurality or resources are different sets of network resources, and wherein the second plurality of resources requires configuration update; and
in response to retrieving the first entry from the plurality of trickle update entries, updating configuration information regarding a first resource associated with the first entry from the plurality of trickle update entries.

2. The computer-implemented method according to claim 1, wherein querying the first resource for the potential change further comprises:
examining metadata in a configuration file associated with the first resource.

3. The computer-implemented method according to claim 1, wherein querying the first resource for the potential change further comprises:
computing a checksum over a configuration file associated with the first resource.

4. The computer-implemented method according to claim 1, further comprising:
writing the information to the discovery database.

5. A system comprising:
a processor;
a data bus coupled to the processor; and
a computer-usable storage medium embodying computer program code, the computer-usable storage medium being coupled to the data bus, the computer program code comprising instructions executable by the processor and configured for:

retrieving a first entry from a plurality of trickle confirmation entries from a trickle confirmation queue, wherein the plurality of trickle confirmation entries from the trickle confirmation queue is associated with a first plurality of resources on a network, wherein the first plurality of resources require configuration confirmation, and wherein each entry in the trickle confirmation queue comprises:
  a resource field that identifies a specific resource from the first plurality of resources,
  a last confirmation time field that stores a last time that the specific resource was examined for resource changes, wherein the resource changes comprise changes to a driver for the specific resource,
  a last update time field that indicates a last time that information stored in a discovery database was updated by a trickle update manager, wherein the discovery database stores information describing the resource changes, and wherein the trickle update manager monitors the specific resource for the resource changes to the specific resource, and
  a potential change field that describes the resource changes for the specific resource;

in response to retrieving the first entry from the plurality of trickle confirmation entries, querying a first resource among the first plurality of resources associated with the first entry from the plurality of trickle confirmation entries for a potential change in configuration to the first resource;

in response to detecting change to a configuration of the first resource, inserting the first entry from the plurality of trickle confirmation entries on a trickle update queue;

retrieving a first entry from a plurality of trickle update entries from the trickle update queue, wherein the plurality of trickle update entries from the trickle update queue is associated with a second plurality of resources on the network, wherein the first plurality of resources and the second plurality or resources are different sets of network resources, and wherein the second plurality of resources requires configuration update; and in response to retrieving the first entry from the plurality of trickle update entries, updating configuration information regarding a first resource associated with the first entry from the plurality of trickle update entries.

6. The system according to claim 5, wherein the instructions configured for querying the first resource for the potential change further include instructions configured for:
  examining metadata in a configuration file associated with the first resource.

7. The system according to claim 5, wherein the instructions configured for querying the first resource for the potential change further include instructions configured for:
  computing a checksum over a configuration file associated with the first resource.

8. The system according to claim 5, wherein the instructions are further configured for:
  writing the information to the discovery database.

9. A computer-usable storage medium embodying computer program code, the computer program code comprising computer executable instructions configured for:
  retrieving a first entry from a plurality of trickle confirmation entries from a trickle confirmation queue, wherein the plurality of trickle confirmation entries from the trickle confirmation queue is associated with a first plurality of resources on a network, wherein the first plurality of resources require configuration confirmation, and wherein each entry in the trickle confirmation queue comprises:
    a resource field that identifies a specific resource from the first plurality of resources,
    a last confirmation time field that stores a last time that the specific resource was examined for resource changes, wherein the resource changes comprise changes to a driver for the specific resource,
    a last update time field that indicates a last time that information stored in a discovery database was updated by a trickle update manager, wherein the discovery database stores information describing the resource changes, and wherein the trickle update manager monitors the specific resource for the resource changes to the specific resource, and
    a potential change field that describes the resource changes for the specific resource;
  in response to retrieving the first entry from the plurality of trickle confirmation entries, querying a first resource among the first plurality of resources associated with the first entry from the plurality of trickle confirmation entries for a potential change in configuration to the first resource;
  in response to detecting change to a configuration of the first resource, inserting the first entry from the plurality of trickle confirmation entries on a trickle update queue;
  retrieving a first entry from a plurality of trickle update entries from the trickle update queue, wherein the plurality of trickle update entries from the trickle update queue is associated with a second plurality of resources on the network, wherein the first plurality of resources and the second plurality or resources are different sets of network resources, and wherein the second plurality of resources requires configuration update; and
  in response to retrieving the first entry from the plurality of trickle update entries, updating configuration information regarding a first resource associated with the first entry from the plurality of trickle update entries.

10. The computer-usable storage medium according to claim 9, wherein the computer executable instructions configured for querying the first resource for the potential change further comprises computer executable instructions configured for:
  examining metadata in a configuration file associated with the first resource.

11. The computer-usable storage medium according to claim 9, wherein the computer executable instructions configured for querying the first resource for the potential change further comprises computer executable instructions configured for:
  computing a checksum over a configuration file associated with the first resource.

12. The computer-usable storage medium according to claim 9, wherein the embodied computer program code further comprise computer executable instructions configured for:
  writing the information to the discovery database.

13. The computer-usable storage medium according to claim 9, wherein the computer executable instructions are deployable to a client computer from a server at a remote location.

14. The computer-usable storage medium according to claim 9, wherein the computer executable instructions are provided by a service provider to a customer on an on-demand basis.

* * * * *